US009828803B2

(12) United States Patent
Korach

(10) Patent No.: US 9,828,803 B2
(45) Date of Patent: Nov. 28, 2017

(54) TRANSPORTABLE DRILLING RIG SYSTEM

(71) Applicant: Nabors Industries, Inc., Houston, TX (US)

(72) Inventor: Donovan Korach, Anchorage, AK (US)

(73) Assignee: Nabors Industries, Inc., Houston, TX (US)

( * ) Notice: Subject to any disclaimer, the term of this patent is extended or adjusted under 35 U.S.C. 154(b) by 177 days.

(21) Appl. No.: 14/463,428

(22) Filed: Aug. 19, 2014

(65) Prior Publication Data
US 2016/0052441 A1 Feb. 25, 2016

(51) Int. Cl.
| | | |
|---|---|---|
| *E21B 7/02* | (2006.01) | |
| *B60P 7/06* | (2006.01) | |
| *B60P 7/08* | (2006.01) | |
| *B66C 23/60* | (2006.01) | |
| *B60P 1/02* | (2006.01) | |
| *B60P 3/00* | (2006.01) | |
| *B60P 3/40* | (2006.01) | |
| *E21B 15/00* | (2006.01) | |

(52) U.S. Cl.
CPC ............. *E21B 7/02* (2013.01); *B60P 1/02* (2013.01); *B60P 3/00* (2013.01); *B60P 3/40* (2013.01); *B60P 7/06* (2013.01); *B60P 7/0807* (2013.01); *B66C 23/60* (2013.01); *E21B 7/023* (2013.01); *E21B 15/00* (2013.01)

(58) Field of Classification Search
CPC ...... B60P 3/40; B60P 3/00; B60P 7/06; B60P 7/0807; E21B 7/02; B66C 23/60
See application file for complete search history.

(56) References Cited

U.S. PATENT DOCUMENTS

| | | | | |
|---|---|---|---|---|
| 4,315,631 A | * | 2/1982 | Rainville | B60P 3/40 |
| | | | | 280/104 |
| 4,375,892 A | * | 3/1983 | Jenkins | B62D 53/064 |
| | | | | 166/79.1 |
| 4,426,182 A | * | 1/1984 | Frias | E21B 19/15 |
| | | | | 193/17 |
| 4,761,108 A | * | 8/1988 | Kress | B62D 53/02 |
| | | | | 280/156 |
| 6,821,066 B2 | * | 11/2004 | Wehrli | B60P 3/40 |
| | | | | 410/32 |
| 7,112,029 B1 | * | 9/2006 | Neatherlin | B60P 3/40 |
| | | | | 280/404 |
| 7,357,612 B1 | | 4/2008 | Paul | |

(Continued)

OTHER PUBLICATIONS

Canadian Office Action dated May 31, 2016 in connection with Canadian Patent Application No. 2,895,305; 5 pp.
Canadian Office Action for Application No. 2,895,305, dated Apr. 6, 2007, 4 pgs.

*Primary Examiner* — Andrew J Triggs
(74) *Attorney, Agent, or Firm* — Haynes and Boone, LLP

(57) ABSTRACT

An apparatus that includes a body structurally arranged to carry a portion of a drilling rig; a first actuator coupled to the body; a first wheeled support coupled to the first actuator, wherein actuation of the first actuator moves the first wheeled support in a vertical direction relative to the body; and a plurality of unit fasteners located on the body, each of the plurality of unit fasteners structurally arranged to engage a rig fastener of a corresponding plurality of rig fasteners located on the drilling rig and to simultaneously couple the body to the drilling rig at multiple points.

13 Claims, 6 Drawing Sheets

(56) References Cited

U.S. PATENT DOCUMENTS

| | | | |
|---|---|---|---|
| 7,357,616 B2 | 4/2008 | Andrews et al. | |
| 7,413,393 B1* | 8/2008 | Barnes | B60P 3/40 280/404 |
| 7,637,512 B1* | 12/2009 | McGhie | B60P 1/54 280/404 |
| 7,828,304 B2* | 11/2010 | Amrine, Jr. | B60G 17/0523 280/6.157 |
| 8,306,695 B2* | 11/2012 | Pedersen | B60P 3/40 410/44 |
| 8,516,751 B2* | 8/2013 | Konduc | E21B 7/02 52/112 |
| 9,091,125 B2* | 7/2015 | Konduc | E21B 15/00 |
| 2004/0211598 A1* | 10/2004 | Palidis | E21B 15/00 175/162 |
| 2004/0240973 A1* | 12/2004 | Andrews | E21B 7/02 414/332 |
| 2005/0194189 A1* | 9/2005 | Barnes | E21B 7/02 175/122 |
| 2007/0126196 A1* | 6/2007 | Klahn | B60D 1/155 280/86.5 |
| 2009/0283324 A1* | 11/2009 | Konduc | E21B 7/02 175/57 |
| 2010/0168960 A1* | 7/2010 | Pederson | B60P 3/40 701/38 |
| 2012/0061533 A1* | 3/2012 | Thoma | B60P 7/0807 248/205.4 |
| 2013/0251474 A1* | 9/2013 | Neumann | B60R 7/02 410/106 |
| 2014/0169920 A1* | 6/2014 | Herman | B60P 1/6427 414/483 |
| 2015/0217609 A1* | 8/2015 | Ellis | B60D 1/24 280/477 |
| 2016/0052441 A1* | 2/2016 | Korach | B60P 1/02 414/495 |

* cited by examiner

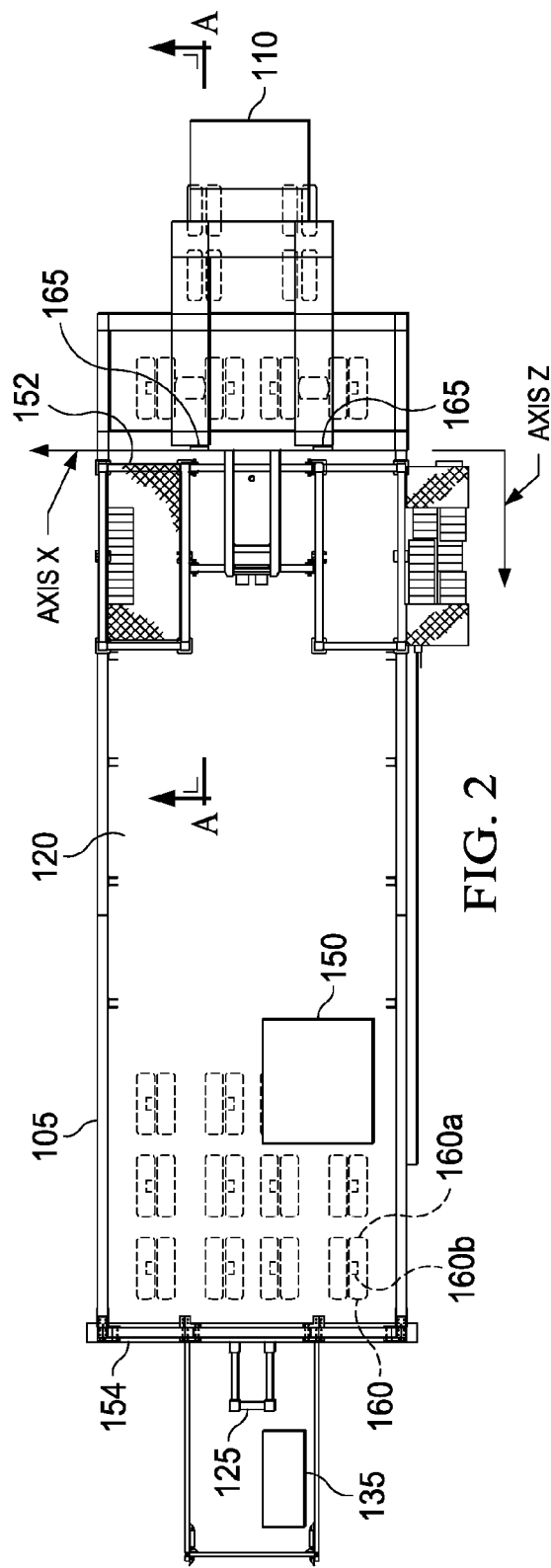

TRANSPORTABLE DRILLING RIG SYSTEM

TECHNICAL FIELD

The present disclosure relates in general to a transportable drilling rig system, and in particular, to a drilling rig system that is driveable from one drill site to another drill site.

BACKGROUND OF THE DISCLOSURE

Drilling operations generally require a drilling rig that includes a drill floor supported by a support structure. The drilling rig may also include support equipment such as mud circulation equipment, blow out preventers, an operator's cabin, etc. When the drilling rig is no longer needed at a drill site, the drilling rig is transported from the drill site to a second drill site. Often, transporting the drilling rig includes removing the support equipment from the drilling rig and disassembling the support structure. After the drilling rig is disassembled, the disassembled parts are moved to the second drill site to be reassembled, which often take days to complete and can delay drilling operations at the second drill site. Therefore, time is lost and the opportunity for mistakes to be made by operators is introduced during the disassembly and reassembly. In addition, when a tractor trailer is used to tow the disassembled parts of the drilling rig between drill sites, the weight of the disassembled parts of the drilling rig are generally transferred to the tractor trailer using a single load point and the disassembled parts of the drilling rig may "float" relative to the tractor trailer, which can cause difficulty in its transportation.

The present disclosure is directed to a drilling rig transportation system and methods that overcome one or more of the shortcomings in the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a top view of an apparatus according to one or more aspects of the present disclosure.

DETAILED DESCRIPTION

Figures 1, 2A:
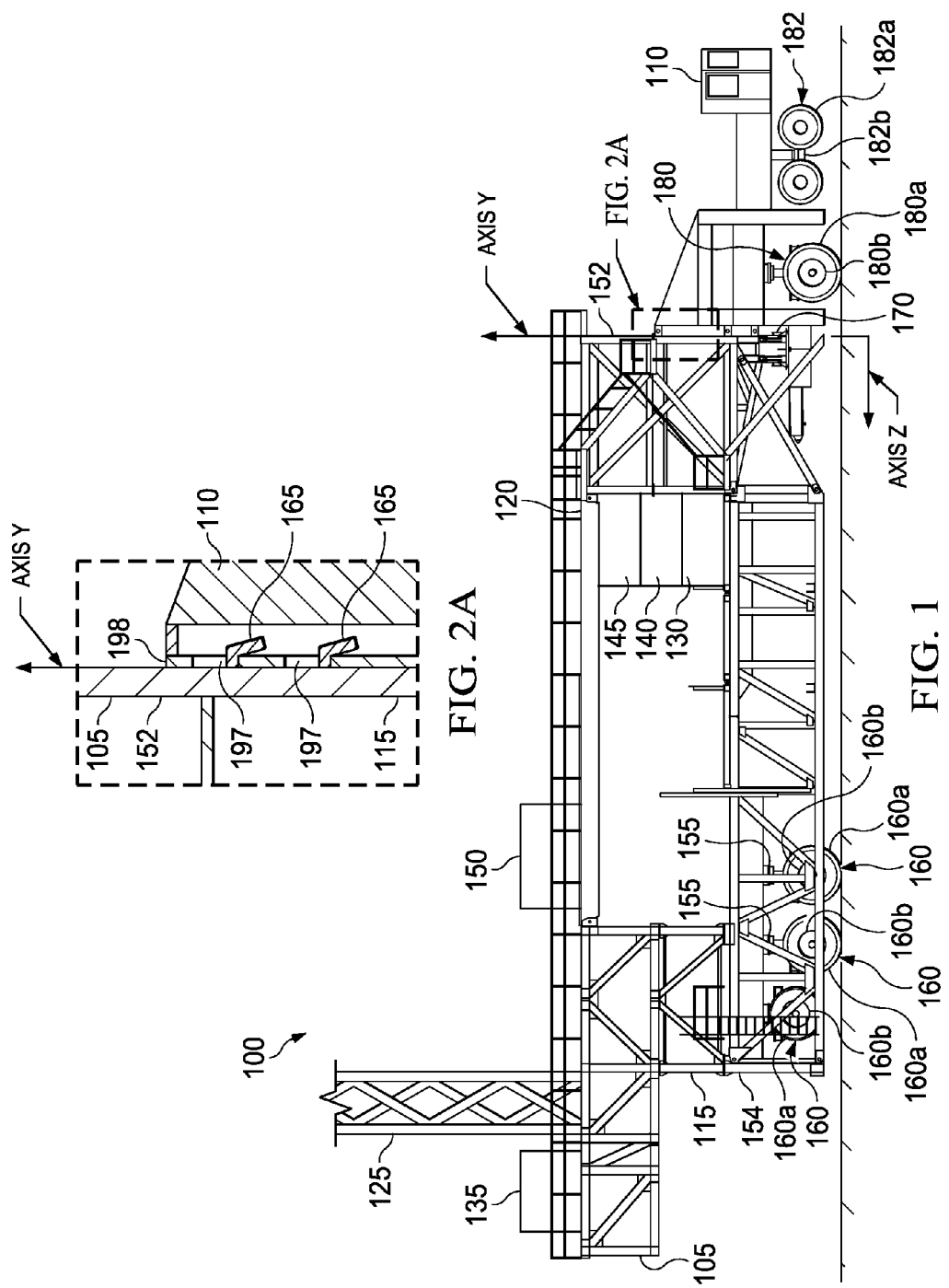
FIG. 1 is an elevational side view of an apparatus according to one or more aspects of the present disclosure.
FIG. 2A is cross-section view of a portion of the apparatus of FIG. 1 detailing a portion 2A shown in FIG. 1.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIGS. 1, 2, and 2A illustrated is an apparatus 100 demonstrating one or more aspects of the present disclosure. The apparatus 100 in the example shown is or includes a land-based drilling rig 105 and a rig transporting unit ("RTU") 110.

As set forth in more detail below, the RTU 110 is arranged to selectively connect to, and tow or drive, the land based drilling rig 105 from one location to another. However, unlike a tow-truck or tractor trailer having a fifth-wheel that couples to a king-pin located on a trailer, the RTU 110 connects securely to the rig 105 in a rigid and fixed manner to form an integrally, rigid fixed driving structure. That is, the RTU 110 is a removable driving unit that may be rigidly fixed to a drilling rig to transport the drilling rig around an oil field. This may lower costs by not requiring each rig to have its own driving structure permanently built in. In some embodiments, and when the drilling rig 105 is integrated with the RTU 110, a wheeled support is positioned outside of a support structure 115 of the drilling rig 105 (not under or beneath the support structure 115).

The drilling rig 105 may include the support structure 115 that supports a rig floor 120. A mast 125 may be secured to the rig floor 120 and may support lifting gear (not shown) above the rig floor 120. In general, the lifting gear is structurally configured to lift and lower a drill string (not shown) that extends downhole using drilling line (not shown) that is coupled to a drawworks (not shown). The drilling rig 105 may also include support equipment, such as for example, a mud distribution system 130; a blow out preventer assembly 135; a master hydraulic unit 140; a controller 145 for operating the support equipment; and/or an operator's cabin 150. In one or more exemplary embodiments, the drilling rig 105 is a modular drilling rig such that the drilling rig 105 is structurally configured to be transported from one drill site to another drill site with the majority of the support equipment intact or assembled. The exemplary drilling rig 105 in FIG. 1 includes a leading end 152 and a trailing end 154. The leading end 152 is configured to rigidly connect to the RTU 110 and can be lifted or lowered using the RTU 110.

In one or more exemplary embodiments, the drilling rig 105 also includes actuators 155 coupled to the support structure 115. In an exemplary embodiment, each of the actuators 155 is also coupled to a wheeled support 160 that includes tires 160a and intermediate support structure 160b, such as wheels, axles, and other structures. In an exemplary embodiment, extending the actuators 155 moves the support structure 115 and the rig floor 120 relative to the wheeled supports 160 in the vertical direction. That is, activating the actuators 155 may raise or lower the drilling rig 105 relative to the wheeled supports 160 and the ground. In an exemplary embodiment, the trailing end 154 includes the wheeled supports 160. Generally, the actuators 155 are extended to raise the support structure 115 off of the ground to prepare for transport and retracted to lower the drilling rig 105 on the ground to prepare for drilling operations. In one or more exemplary embodiments, the actuators 155 are hydraulic cylinders. In an exemplary embodiment, the actuators 155 are, or include, telescoping, hydraulic cylinders. In several exemplary embodiments, each of the actuators 155 is, includes, or is part of, a hydraulic actuator, an electromagnetic actuator, a pneumatic actuator, a linear actuator, and/or any combination thereof. In an exemplary embodiment, the wheeled supports 160 may be "free-rolling" such that the drilling rig 105 may be towed. Alternatively, the wheeled supports 160 may be powered by an engine or a motor on the rig or elsewhere.

In one or more exemplary embodiments and as shown in FIG. 2A, the leading edge 152 of the drilling rig 105 also includes a plurality of fasteners 165 that enable the land-based drilling-rig 105 to selectively and rigidly connect to the RTU 110. In an exemplary embodiment, the plurality of fasteners 165 are spaced in the vertical direction along the height of the leading end 152. In one or more exemplary embodiments, the fasteners 165 extend from the support structure 115, such as for example extending from an outer side edge of the support structure 115 such that the fasteners 165 are accessible from a location outside of the drilling rig 105. In one or more exemplary embodiments, the fasteners 165 are hooks extending from the support structure 115. However, each of the fasteners 165 may be any variety of fastener such as for example, a pin, a slot, a bolt, or other suitable fastener. In one or more exemplary embodiments, the plurality of fasteners 165 are spaced horizontally in a first direction along an x axis and are spaced vertically in a second direction along a y axis. For example, the fasteners 165 may form two vertical rows spaced in parallel. In one or more exemplary embodiments, the drilling rig 105 also includes a base fastener 170 (shown in FIG. 1) that extends downward from the support structure 115 in a vertical direction away from the drilling floor 120. In an exemplary embodiment, the base fastener 170 is a pin, a slot, a bolt, a pad-eye, or other suitable fastener. In an exemplary embodiment, the base fastener 170 is spaced horizontally from the fasteners 165 in a second horizontal direction along a z axis. The x, y, and z axes are shown in FIGS. 1, 2, and 2A for reference.

Figure 3:
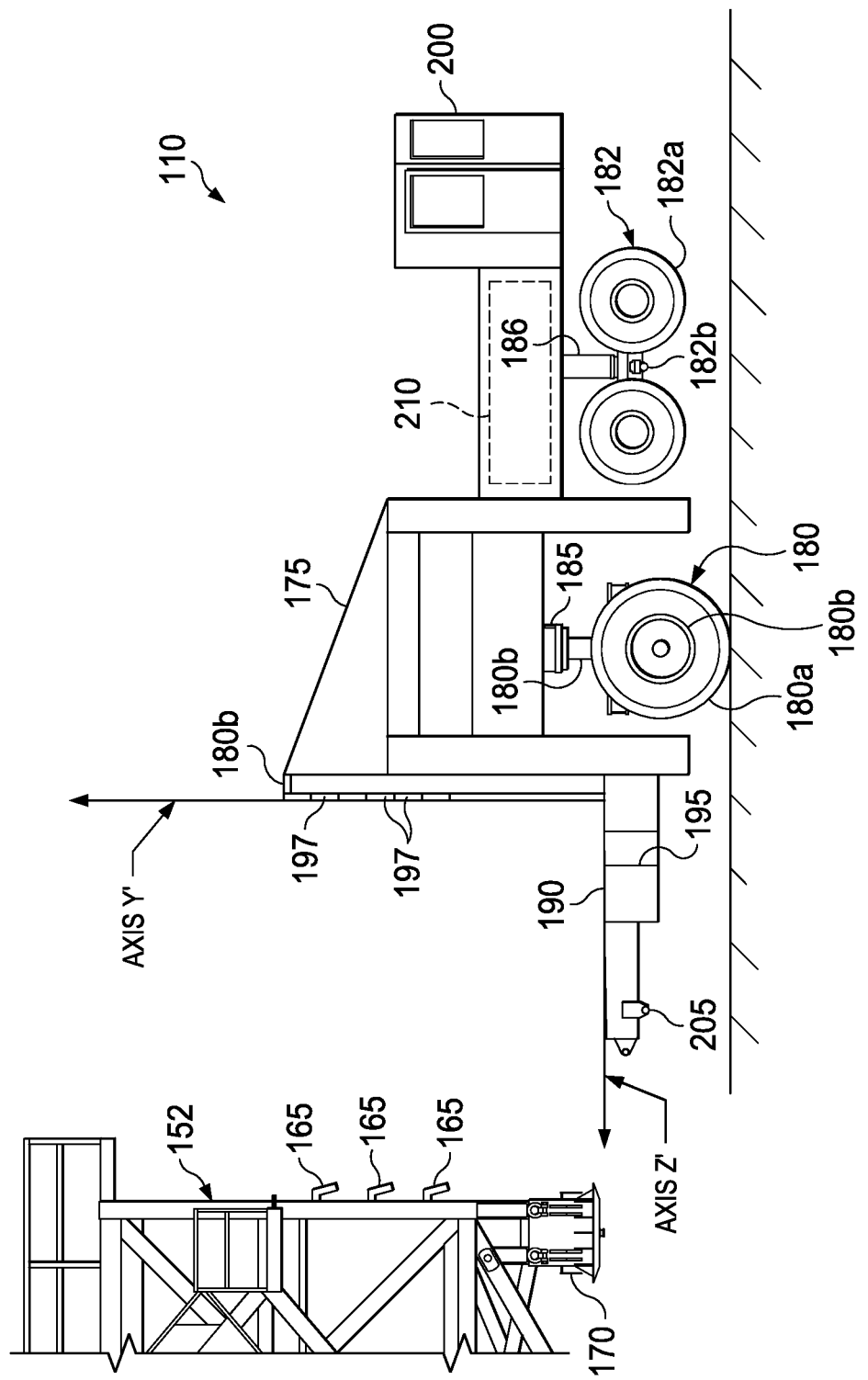
FIG. 3 an elevational side view of an apparatus according to one or more aspects of the present disclosure.
Figure 4:
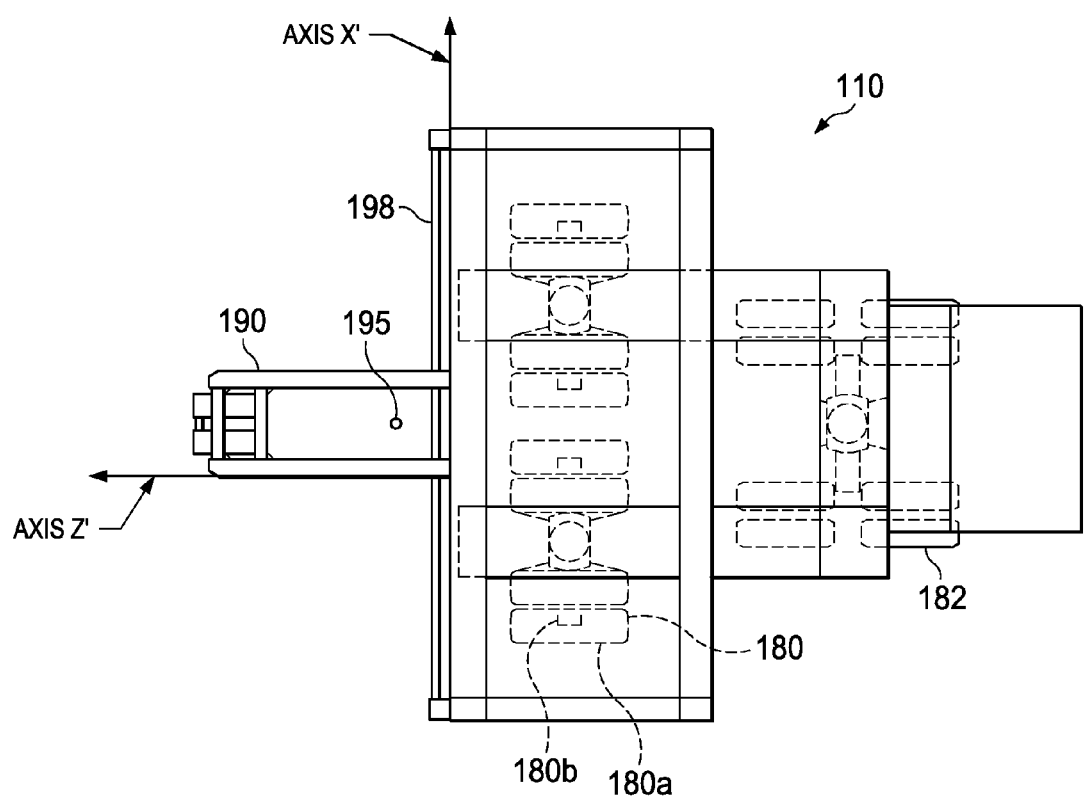
FIG. 4 is a top view of an apparatus according to one or more aspects of the present disclosure.

In one or more exemplary embodiments and as illustrated in FIGS. 3 and 4, the RTU 110 includes a body 175 that is supported by a plurality of primary wheeled supports 180 that include tires 180a and intermediate support structure 180b, such as wheels, axles, and other structures. In one or more exemplary embodiments, the RTU 110 may also be supported by a plurality of secondary wheeled supports 182 that include tires 182a and intermediate support structure 182b, such as wheels, axles, and other structures. In an exemplary embodiment, the secondary wheeled supports 182 may be free-rolling and may engage the ground when the RTU 110 is transported between rigs. The primary wheeled supports 180 may be robust enough to carry a portion of the drilling rig 105 and may be raised from the ground when moved between drilling rigs to enable faster movement. An actuator 185 is coupled to each of the primary wheeled supports 180 and the body 175 such that activation of the actuator 185 moves the body 175 relative to the primary wheeled supports 180. An actuator 186 is coupled to each of the secondary wheeled supports 182 and the body 175 such that activation of the actuator 186 moves the body 175 relative to the secondary wheeled supports 182. In an exemplary embodiment, the actuators 185 and/or 186 are, or include, telescoping, hydraulic cylinders. In several exemplary embodiments, each of the actuators 185 and/or 186 is, includes, or is part of, a hydraulic actuator, an electromagnetic actuator, a pneumatic actuator, a linear actuator, and/or any combination thereof. In one or more exemplary embodiments, the RTU 110 also includes an arm 190 that extends horizontally from the body 175 and is structurally configured to extend beneath and, in some embodiments, connect to at least a portion of the drilling rig 105. In one or more exemplary embodiments, the RTU 110 includes a base fastener 195 that is located on the arm 190. In one or more exemplary embodiments, the RTU 110 also includes fasteners 197 that are spaced in a vertical direction along the height of the RTU 110. In one or more exemplary embodiments, the fasteners 197 are spaced horizontally in a first direction along an x' axis and are spaced vertically in a second direction along a y' axis. In an exemplary embodiment, the base fastener 195 is spaced horizontally from the fasteners 197 in a second horizontal direction along a z' axis. The x', y', and z' axes are provided in FIGS. 3 and 4 for reference. In one or more exemplary embodiments, each of the fasteners 197 corresponds to a fastener 165 on the drilling rig 110 (shown in FIGS. 1, 2, and 2A). In one or more exemplary embodiments, each of the fasteners 197 is a vertically-extending slot formed within a plate 198 that is connected to or forms a part of the body 175. However, each of the fasteners 197 may be may be a pin, a bolt, or other suitable fastener that is structurally configured to fasten with its corresponding fastener 165. In addition, it is worth noting that while hooks or projecting portions are shown as fasteners 165 on the drilling rig 105 and slots or receiving portions are shown as fasteners 197 on the RTU 110, other embodiments have the fasteners switched so that hooks or projecting portions are on the RTU 110 and the slots or receiving portions are on the drilling rig 105.

Extending and retracting the actuators 185 causes the body 175 to move vertically relative to the wheeled supports 180 and the ground, such that extending and retracting the actuators 185 allows for the height of the fasteners 197 and 195 and the arm 190 to be adjusted. The actuators 185 are substantially similar to the actuators 155 and therefore will not be described further here.

In one or more exemplary embodiments, the wheeled supports 180 are steerable. In one or more exemplary embodiments, the RTU 110 also includes an operator's cabin 200 such that the RTU 110 may be controlled and/or steered by an operator riding in the operator's cabin 200. However, the RTU 110 may also be controlled remotely. For example, the RTU 110 may include a receiver and a remote control may communicate, either wirelessly or via wired connection, control signals representing commands to be carried out by the RTU 110, including steering, raising, lowering, or other commands.

In one or more exemplary embodiments, the RTU 110 may also include a connection 205 located on the arm 190 such that the RTU 110 may be towed or pulled by another vehicle. In one or more exemplary embodiments, the connection 205 is a king pin connection, but any type of connection is contemplated here. In the exemplary embodiment shown, the RTU 110 is a vehicle having an engine 210 structurally configured to pull a drilling rig 105. In one or more exemplary embodiments, the RTU 110 has self-steering capacity and is self-powered by axle motors with an auxiliary prime mover on board. However, the RTU 110 may be also powered by off-board generation. As can be seen in FIG. 1, when the rig 105 is engaged with the RTU 110, the secondary wheeled supports 182 are at a different elevation than the primary wheeled supports 180. Thus, the primary wheeled supports 180 have the steering capability and are powered by the engine 210 and provide driving power to move the rig 105. In an exemplary embodiment, the motor or engine 210 is also sized and configured to carry the leading end 152 of the drilling rig 105. In an exemplary embodiment, the secondary wheeled supports 182 are sized and structurally configured to carry the RTU 110. In an exemplary embodiment, the secondary wheeled supports 182 may be free rolling such that the RTU 110 can be towed via the king pin or connection 195 to desired locations, with the primary wheeled supports 180 in a raised position and the secondary wheeled supports 182 in a lowered position.

Figure 5:
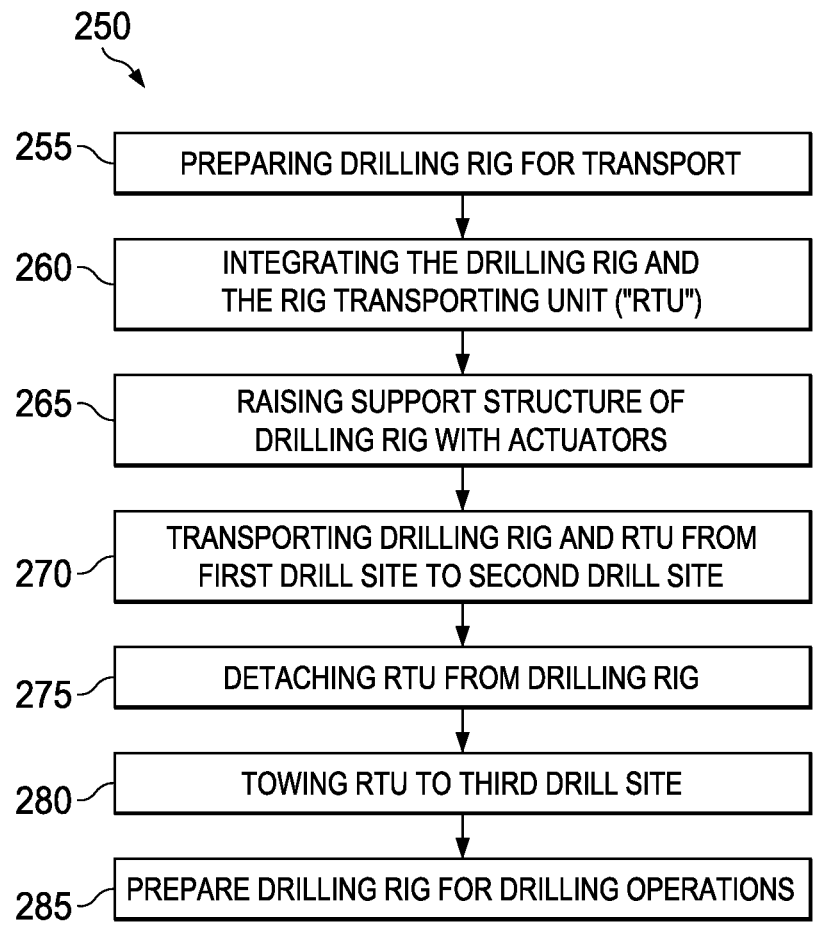
FIG. 5 a flow-chart diagram of at least a portion of a method according to one or more aspects of the present disclosure.

As illustrated in FIG. 5, a method of transporting a drilling rig 105 is generally referenced as numeral 250. The method 250 includes preparing the drilling rig 105 for transport at step 255, integrating the drilling rig 105 with the RTU 110 at step 260, raising the support structure 115 of the drilling rig 105 with the actuators 155 at step 265, transporting the drilling rig 105 and the RTU 110 from a first drilling site to a second drilling site at step 270, detaching the RTU 110 from the drilling rig 105 at step 275, towing the RTU to a third drilling site at step 280, and preparing the drilling rig 105 for drilling operations at step 285. Details of these steps are provided below.

In an exemplary embodiment, the drilling rig 105 is prepared for transport at the step 255. In an exemplary embodiment, preparing the drilling rig 105 for transport may include disassembling and securing at least a portion of the support equipment. For example, the lifting equipment may be removed from the mast 125, and/or the mast 125 or a portion of the mast 125 may be disassembled. However, a variety of other activities may be performed in order to prepare the drilling rig 105 for transport. In a preferred embodiment, the system is transported without disassembling the support structure 115 and the rig floor 120.

Figure 6:
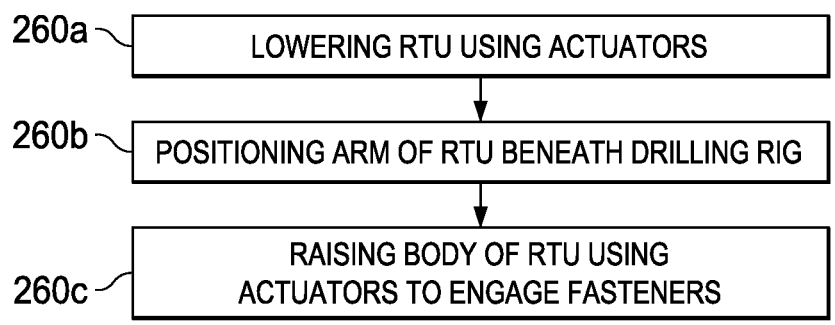
FIG. 6 a flow-chart diagram of at least a portion of a method according to one or more aspects of the present disclosure.

In an exemplary embodiment, the drilling rig 105 is integrated with the RTU 110 at the step 260. FIG. 6 shows an exemplary method for integrating the drilling rig 105 with the RTU 110. In one or more exemplary embodiments and referring to FIG. 6, integrating the drilling rig 105 with the RTU 110 includes one or more sub-steps of lowering the body 175 of the RTU 110 using the actuators 185 at step 260a, positioning the arm 190 of the RTU 110 beneath at least a portion of the drilling rig 105 at step 260b, and raising the body 175 of the RTU 110 using the actuators 185 to engage the fasteners 165 and 170 to the fasteners 197 and 195, respectively, at step 260c.

At the step 260a, the actuators 185 are retracted so that the body 175 and the fasteners 197 and 195 are located at a height, relative to the ground, that is less than the height of the fasteners 165 and 155. That is, the actuators 185 are retracted such that the arm 190 is structurally configured to extend beneath at least a portion of the drilling rig 105.

At the step 260b, the RTU 110 is positioned such that the arm 190 of the RTU 110 extends beneath at least a portion of the support structure 115 at the step 260b. In some embodiments, the arm 190 is positioned such that the base fastener 195 is located below the base fastener 170.

At the step 260c, the actuators 185 are activated to raise the body 175 of the RTU 110 to engage the fasteners 165 and 170 with the fasteners 197 and 195, respectively. In one or more exemplary embodiments, the body 175, along with the fasteners 197 and the base fastener 195, is raised so that each of the fasteners 197 engages its corresponding fastener 165 and the base fastener 195 engages the base fastener 170. In one or more exemplary embodiments, the fasteners 165, 170, 195, and 197 create a multi-point fastening system that integrates the RTU 110 with the drilling rig 105. That is, the multi-point fastening system secures the RTU 110 to the drilling rig 105 such that the RTU 110 is rigidly fixed to the drilling rig 105. In order words, the body 175 of the RTU 110 cannot pivot or "float" relative to the drilling rig 105 and vice versa.

In one or more exemplary embodiments, the rigid fixation is accomplished by the multi-point fastening system being arranged as a "three dimensional" fastening system. Particularly, as explained above, the drilling rig 105 includes multiple fasteners 165 and 170 spaced along the x axis, the y axis, and the z axis and the RTU 110 has multiple corresponding fasteners 197 and 190 spaced along the x' axis, the y' axis, and the z' axis. This three dimensional fastening system serves to support and stabilize the drilling rig 105 when it is carried by the RTU 110.

In one or more exemplary embodiments, the multi-point fastening system is a self-aligning fastening system. That is, the fasteners 165 engage the fasteners 197 in a two-step process with the first step including aligning each of the fasteners 165 with a corresponding fastener 197. For example, when each of the fasteners 165 is a hook that extends from the drilling rig 105 and when each of the fasteners 197 is a slot formed within the plate 198 extending along the height of the RTU 110, the first step involves aligning the fasteners 165 and 197 by extending each of the hooks within an upper or middle portion of a corresponding slot. During the first step, the fastener 170 is not engaged with the fastener 195. During the second step, the plate 198 and its corresponding slots are raised, using the actuators 185 on the RTU 110. This in turn causes the hook forming the fasteners 165 to engage a lower edge that forms the slot such that the lower edge supports the hook. Raising the plate 198 and engaging the hook with the lower edge that forms the slot during the second step aligns the fastener 195 with the fastener 170. In an exemplary embodiment, raising the plate 198 to engage the hook with the lower edge that forms the slot during the second step also engages the fastener 195 with the fastener 170. Thus, the multi-fastener system is a self-aligning system, as engaging the first fasteners 197 with the fasteners 165 aligns the fasteners 195 and 170. With the fasteners 195 and 170 aligned, these may be connected to complete the three dimensional fastening of the drilling rig 105 to the RTU 110.

With the drilling rig 105 and the RTU 110 now integrated or rigidly fixed to each other, the method returns to FIG. 5 at the step 260. In an exemplary embodiment, the actuators 155 can be extended to raise the support structure 115 relative to the wheeled supports 160 and the ground at the step 265. Extending the actuators 155 lifts the support structure 115 from the ground and allows the wheeled supports 160 to support the drilling rig 105 or at least a portion of the drilling rig 105 so that the drilling rig 105 may be rolled across the ground using the wheeled supports 160. In one or more exemplary embodiments and when the drilling rig 105 is integrated with the RTU 110, one of the wheeled supports 180 is positioned outside of the support structure 115 (not under or beneath the support structure 115).

In one or more exemplary embodiments, the drilling rig 105 and the RTU 110 are transported to the second drill site at the step 270. In one or more embodiments, the RTU 110 pulls, tows, or otherwise drives the drilling rig 105 from the first drill site to the second drill site. However, the RTU 110 may also push the drilling rig 105 to the second drill site. In one or more exemplary embodiments, the RTU 110 steers the drilling rig 105. During transport from the first drill site to the second drill site, the drilling rig 105 includes one or more of the mast 125; the mud distribution system 130; the blow out preventer assembly 135; the master hydraulic unit 140; the controller 145 for operating the support equipment; and the operator's cabin 150. As the drilling rig 105 is integrated with the RTU 110, the wheeled supports 160 and/or 180 include a larger tire system having heavier load capacity than may be used than when the drilling rig 105 is not integrated with a vehicle that is towing the drilling rig 105. In an exemplary embodiment, the RTU 110 is structurally configured to pull or push the drilling rig 105 at a speed greater than 0.5 miles per hour; greater than 1 mile per hour; greater than 2 miles per hour; and/or greater than 2.4 miles per hour.

In one or more exemplary embodiments, the RTU 110 is detached from the drilling rig 105 at the step 275. In an exemplary embodiment, the actuators 155 may be retracted to lower the support structure 115 such that the support structure 115 rests on the ground or other surface near the second drill site. In an exemplary embodiment, the actuators 185 may also be retracted to lower the body 175 of the RTU 110 such that the fasteners 197 and 195 disengage from the fasteners 165 and 170.

In an exemplary embodiment, the RTU 110 is towed to a third drill site at the step 280. In an exemplary embodiment and after the RTU 110 is detached from the drilling rig 105, the RTU 110 may then be driven or otherwise removed from under or near the drilling rig 105. In some examples, the RTU 110 may then be driven or transported to a second rig within the same or a different oil field and used to transport the second rig in the same manner discussed above. Thus, the RTU 110 may be integrated with any of a variety of different rigs in an oil field in order to quickly and easily transport each rig with minimal effort and expense. In an exemplary embodiment, the connection 205, such as the king pin, of the RTU 110 is attached to a fifth-wheel connection or similar connection of a tractor trailer (not shown) and towed to a third drill site within the same or a different oil field.

In one or more exemplary embodiments, the drilling rig 105 is prepared for drilling operations at the step 285. Preparing the drilling rig 105 for drilling operations may include reassembling any support equipment or other equipment that had been disassembled in the step 255.

In an exemplary embodiment, the method 250 allows for the integration of the drilling rig 105 with the RTU 110. The method 250 allows for the RTU 110 to support a portion of the load associated with the drilling rig 105, and therefore, the loading on roads is more distributed than when the drilling rig 105 is not integrated with a vehicle that is towing the drilling rig 105. The method 250 also allows for the load of the drilling rig 105 to be transferred to the RTU 110 using more than one fastener, and therefore distributes the load of the drilling rig 105 to multiple fasteners. The method 250 may also reduce the amount of time and cost required to prepare the drilling rig 105 for drilling operations as the drilling rig 105 is transported from the first drill site to the second drill site with the support structure 115 assembled and/or with the drilling rig 105 including one or more of the mud distribution system 130; the blow out preventer assembly 135; the master hydraulic unit 140; the controller 145 for operating the support equipment; and the operator's cabin 150. The method 250 results in a self-contained moving system that integrates the RTU 110 with the support structure 115, raises the support structure 115, and powers and steers the apparatus 100 from one location to the another location.

Figure 7:
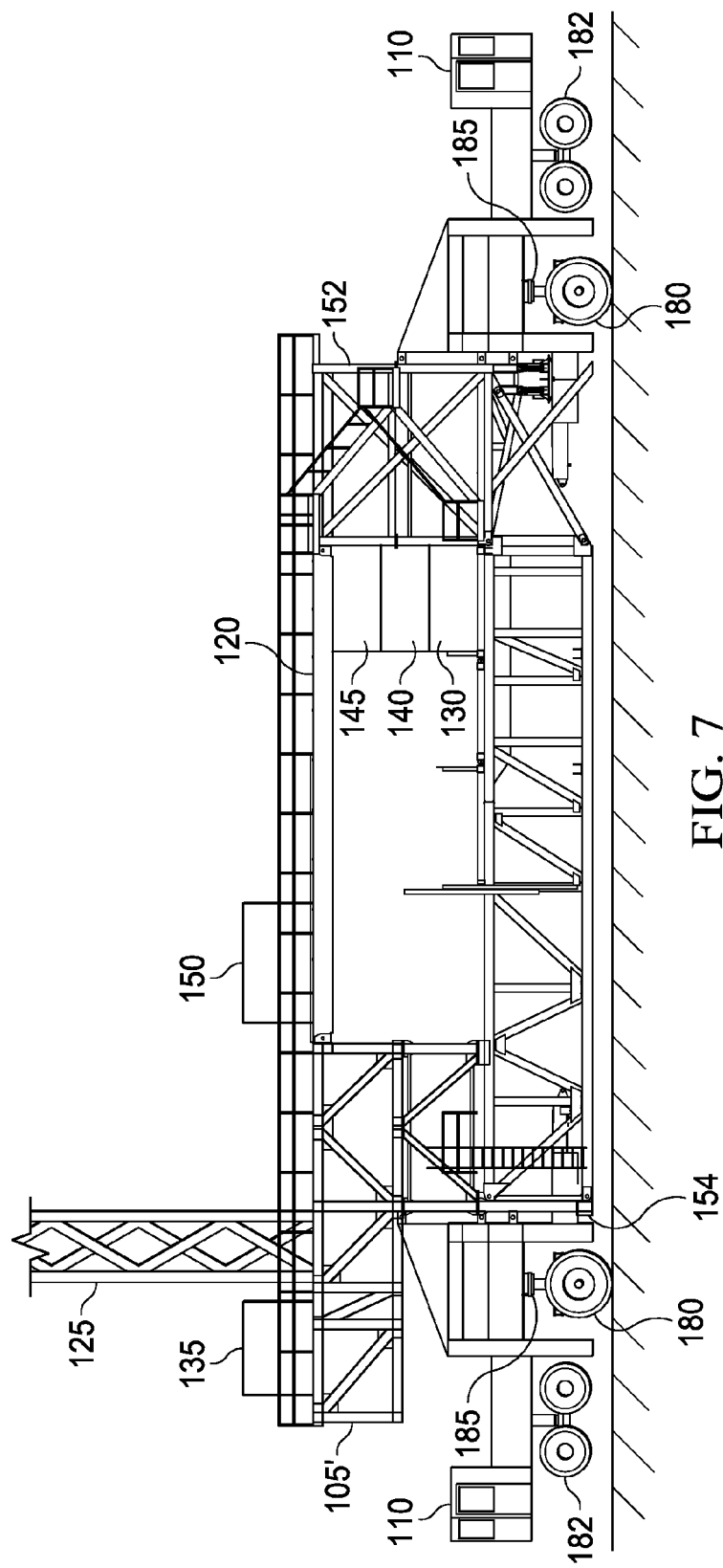
FIG. 7 an elevational side view of an apparatus according to one or more aspects of the present disclosure.

FIG. 7 illustrates an alternative drilling rig 105' during transport by two RTUs 110. In an exemplary embodiment, the drilling rig 105' is substantially identical to the drilling rig 105 except the actuators 155 and the wheeled supports 160 are omitted from the drilling rig 105'. Instead, the drilling rig 105' may include a plurality of fasteners located on the trailing end 154 of the support structure 115 that are substantially identical to the plurality of fasteners 165 that are located on the leading end 152 of the support structure 115. In one or more exemplary embodiments, the drilling rig 105' may also include a base fastener (not shown) located near the trailing end 154 of the support structure 115 that is substantially identical to the base fastener 170 that is located near the leading end 152 of the support structure 115. In an exemplary embodiment, the drilling rig 105' is transportable using more than one RTU 110, with one RTU 110 engaging the fasteners 165 and 170 and another RTU 110 engaging the plurality of fasteners that are located the leading end 154 of the support structure 115.

In an exemplary embodiment, the actuators 185 have the same ratings and technical specifications as the actuators 155, which are sized to support a drilling rig 105. In an exemplary embodiment, the wheeled supports 180 have the same ratings and technical specifications as the wheeled supports 160, which are sized to support a drilling rig 105. In an exemplary embodiment, the wheeled supports 182 are sized and configured to support the RTU 110.

In view of all of the above and the figures, one of ordinary skill in the art will readily recognize that the present disclosure introduces an apparatus that includes a body structurally arranged to carry a portion of a drilling rig; a first actuator coupled to the body; a first wheeled support coupled to the first actuator, wherein actuation of the first actuator moves the first wheeled support in a vertical direction relative to the body; and a plurality of unit fasteners located on the body, each of the plurality of unit fasteners structurally arranged to engage a rig fastener of a corresponding plurality of rig fasteners located on the drilling rig and to simultaneously couple the body to the drilling rig at multiple points. In one aspect, the apparatus also includes an engine structurally configured to move the rig transporting unit and the drilling rig. In another aspect, the apparatus also includes a second actuator coupled to the body; and a second wheeled support coupled to the first actuator, wherein actuation of the second actuator moves the second wheeled support in a vertical direction relative to the body; wherein the first actuator and the second actuator are movable from a rig moving position in which the first actuator is extended and the second actuator is retracted to a unit towing position in which the first actuator is retracted and the second actuator is extended; wherein the first wheeled support is structurally configured to support at least the portion of the drilling rig and the rig transporting unit when in the rig moving position; and wherein the second wheeled support is structurally configured to support the rig transporting unit when in the unit towing position. In yet another aspect, the rig transporting unit is a vehicle and the first wheeled support includes a steerable wheel. In another aspect, the body includes an arm that extends in the horizontal direction such that the arm is structurally configured to extend beneath at least the portion of the drilling rig; and the plurality of unit fasteners includes a portion of the plurality of unit fasteners, each unit fastener within the portion spaced vertically along the height of the body; and a base unit fastener located on the arm. In another aspect, the base unit fastener and the arm are structurally configured to move relative to the first wheeled support. In yet another aspect, the apparatus also includes a connector structurally configured to tow the rig transporting unit.

The present disclosure also introduces an apparatus that includes a drilling rig that includes a support structure supporting a drill floor; a plurality of rig actuators coupled to the support structure; a plurality of wheeled rig supports coupled to the plurality of rig actuators, each rig actuator of the plurality of rig actuators being structurally configured to move a corresponding wheeled rig support of the plurality of wheeled rig supports in a vertical direction relative to the drill floor; and a plurality of spaced-apart rig fasteners attachable to the support structure; and a rig transport unit configured to carry a portion of the weight of the drilling rig and to move the drilling rig, wherein the rig transport unit includes a plurality of spaced-apart unit fasteners positioned and arranged to couple with the plurality of spaced-apart rig fasteners and to rigidly fix the drilling rig to the rig transport unit. In one aspect, the rig transporting unit includes a body structurally arranged to carry a portion of the drilling rig; a first actuator coupled to the body; and a first wheeled support coupled to the first actuator, wherein actuation of the first actuator moves the first wheeled support in a vertical direction relative to the body; wherein the plurality of spaced-apart unit fasteners are located on the body. In yet another aspect, the rig transporting unit also includes an engine structurally configured to move the rig transporting unit and the drilling rig. In yet another aspect, the plurality of spaced-apart rig fasteners includes a plurality of hooks; and the plurality of spaced-apart unit fasteners includes a plurality of vertically extending slots. In another aspect, the plurality of spaced-apart rig fasteners includes a portion of the plurality of spaced-apart rig fasteners, each rig fastener from the portion of the plurality of spaced-apart rig fasteners spaced vertically along the height of the support structure; and a base rig fastener horizontally offset from the portion of the plurality of spaced-apart rig fasteners such that the position of the drilling rig is rigidly attached to the rig transporting unit when the drilling rig is coupled to the rig transporting unit. In yet another aspect, the plurality of unit fasteners includes a portion of the plurality of spaced-apart unit fasteners, each unit fastener from the portion of the plurality of spaced-apart unit fasteners spaced vertically along the height of the body of the rig transporting unit; and a base unit fastener structurally configured to engage the base rig fastener of the drilling rig, the base unit fastener of the rig transporting unit being located on an arm that extends horizontally from the body such that the arm is structurally configured to extend beneath at least a portion of the drilling rig. In yet another aspect, the rig transporting unit includes a connector structurally configured to tow the rig transporting unit.

The present disclosure also introduces a method that includes selectively integrating the drilling rig with a rig transporting unit using a multi-point fastening system by attaching a plurality of spaced-apart rig fasteners associated with the drilling rig to a plurality of spaced-apart unit fasteners associated with the rig transporting unit in a rigid relationship; transporting the drilling rig and the rig transporting unit using the rig transporting unit; and detaching the drilling rig from the rig transporting unit by disconnecting the plurality of spaced-apart rig fasteners from the plurality of spaced-apart unit fasteners. In one aspect, the rig transporting unit includes a body structurally arranged to carry a portion of the drilling rig; a first actuator coupled to the body; a first wheeled support coupled to the first actuator, wherein actuation of the first actuator moves the first wheeled support in a vertical direction relative to the body; and wherein the plurality of spaced-apart unit fasteners are located on the body; and wherein selectively integrating the drilling rig with the rig transporting includes retracting the first actuator to lower a height of the body and to align at least one of the spaced-apart unit fasteners with its corresponding spaced-apart rig fastener; extending the first actuator to increase the height of the body and to engage the at least one of the spaced-apart unit fasteners with its corresponding spaced-apart rig fastener; and further extending the first actuator to support the portion of the drilling rig on the first wheeled support. In one aspect, the multi-point fastening system further includes a base unit fastener that is located on an arm that extends horizontally from the body of the rig transporting unit; a base rig fastener that is located on the drilling rig and that corresponds to the base unit fastener. In yet another aspect, the method also includes self-aligning the base unit fastener with the base rig fastener by aligning the plurality of spaced-apart rig fasteners with the plurality of spaced-apart unit fasteners. In one aspect, the rig transporting unit has an engine structurally configured to move the rig transporting unit and the drilling rig; and the first wheeled support is a steerable wheel. In yet another aspect, the plurality of spaced-apart rig fasteners includes a plurality of hooks; and the plurality of spaced-apart unit fasteners includes a plurality of vertically extending slots. In yet another aspect, the rig transporting unit includes a connector structurally configured to tow the rig transporting unit.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described herein.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. A rig transporting unit, comprising:
a body structurally arranged to carry a portion of a drilling rig, the body comprising an arm that extends in a horizontal direction and is structurally configured to extend beneath at least the portion of the drilling rig;
a first actuator coupled to the body;
a first wheeled support coupled to the first actuator, wherein actuation of the first actuator moves the first wheeled support in a vertical direction relative to the body; and
a plurality of unit fasteners located on the body, each unit fastener of the plurality of unit fasteners structurally arranged to engage a rig fastener of a corresponding plurality of rig fasteners located on a drilling rig that includes the portion of the drilling rig and to simultaneously couple the body to the drilling rig at multiple points;
wherein the plurality of unit fasteners comprises:
at least two unit fasteners spaced vertically along a height of the body relative to a ground; and
a base unit fastener located on the arm and horizontally offset from the at least two unit fasteners; and
wherein the body, the first actuator, the first wheeled support, and the plurality of unit fasteners form the rig transporting unit, the rig transporting unit being selectively removable from the drilling rig.

2. The rig transporting unit of claim 1, further comprising an engine structurally configured to move the rig transporting unit and the drilling rig.

3. The rig transporting unit of claim 1, further comprising:
a second actuator coupled to the body; and
a second wheeled support coupled to the second actuator, wherein actuation of the second actuator moves the second wheeled support in a vertical direction relative to the body;
wherein the first actuator and the second actuator are movable to a rig moving position in which the first actuator is extended and the second actuator is retracted such that the first wheeled support contacts the ground and the second wheeled support is lifted from the ground; and
wherein the first wheeled support is structurally configured to support at least the portion of the drilling rig and the rig transporting unit when in the rig moving position.

4. The rig transporting unit of claim 1, wherein the rig transporting unit is a vehicle and the first wheeled support comprises a steerable wheel.

5. The rig transporting unit of claim 1, wherein the base unit fastener and the arm are structurally configured to move relative to the first wheeled support.

6. The rig transporting unit of claim 1, further comprising a connector structurally configured to tow the rig transporting unit.

7. The rig transporting unit of claim 1, wherein each unit fastener of the plurality of unit fasteners is structurally arranged to engage the rig fastener of the corresponding plurality of rig fasteners located on the drilling rig when the drilling rig comprises one or more a mud distribution system, a blow out preventer assembly, and a master hydraulic unit.

8. A rig transporting unit, comprising:
a body structurally arranged to couple to a leading end of a drilling rig and to carry at least a portion of the drilling rig;
a first actuator coupled to the body;
a first wheeled support coupled to the first actuator, wherein actuation of the first actuator moves the first wheeled support in a vertical direction relative to the body;
a plurality of unit fasteners located on the body, each unit fastener of the plurality of unit fasteners structurally arranged to engage a rig fastener of a corresponding plurality of rig fasteners located on the leading end of the drilling rig and to simultaneously couple the body to the drilling rig at multiple points;
an arm that is coupled to the body and that extends away from the body in a horizontal direction, wherein the arm is structurally configured to extend below the drilling rig; and
a base unit fastener located on the arm;
wherein the plurality of unit fasteners is structurally arranged to rigidly fix the drilling rig to the rig transporting unit;
wherein the plurality of unit fasteners comprises at least two unit fasteners spaced vertically along a height of the body relative to a ground;
wherein the base unit fastener is structurally configured to engage a corresponding base rig fastener that is located on the drilling rig; and
wherein the base unit fastener is a different type of fastener from the plurality of unit fasteners located on the body.

9. The rig transporting unit of claim 8, further comprising:
a second actuator coupled to the body; and
a second wheeled support coupled to the second actuator, wherein actuation of the second actuator moves the second wheeled support in the vertical direction relative to the body;
wherein the first actuator and the second actuator are movable to a rig moving position; and
wherein when in the rig moving position, the first actuator is extended and the second actuator is retracted such that the first wheeled support contacts the ground and the second wheeled support is lifted from the ground.

10. The rig transporting unit of claim 8,
wherein the plurality of unit fasteners comprises a plurality of vertically extending slots; and
wherein the plurality of rig fasteners comprises a plurality of hooks.

11. The rig transporting unit of claim 8, further comprising a king pin connection located on the arm.

12. The rig transporting unit of claim 8, wherein each unit fastener of the plurality of unit fasteners is structurally arranged to engage the rig fastener of the corresponding plurality of rig fasteners located on the drilling rig when the drilling rig comprises one or more a mud distribution system, a blow out preventer assembly, and a master hydraulic unit.

13. A rig transporting unit, comprising:
a body structurally arranged to couple to a leading end of a drilling rig and to carry at least a portion of the drilling rig;
a first actuator coupled to the body;
a first wheeled support coupled to the first actuator, wherein actuation of the first actuator moves the first wheeled support in a vertical direction relative to the body;
a plurality of unit fasteners located on the body, each unit fastener of the plurality of unit fasteners structurally arranged to engage a rig fastener of a corresponding plurality of rig fasteners located on the leading end of the drilling rig and to simultaneously couple the body to the drilling rig at multiple points; and
an arm that is coupled to the body and that extends away from the body in a horizontal direction, wherein the arm is structurally configured to extend below the drilling rig;
wherein the plurality of unit fasteners is structurally arranged to rigidly fix the drilling rig to the rig transporting unit;
wherein the first actuator is movable to raise and lower the body and the plurality of unit fasteners relative to the drilling rig from a first position to a second position;
wherein in the first position, the arm extends below the drilling rig and the plurality of unit fasteners are aligned with but not engaged with the corresponding plurality of rig fasteners; and
wherein in the second position, the arm extends below the drilling rig and the plurality of unit fasteners are aligned with and engaged with the corresponding plurality of rig fasteners.

* * * * *